(12) United States Patent
Ouchi

(10) Patent No.: US 7,268,832 B2
(45) Date of Patent: Sep. 11, 2007

(54) SPECIAL EFFECT DEVICE, KEY SIGNAL CONTROL DEVICE AND KEY SIGNAL CONTROL METHOD

(75) Inventor: Toshiaki Ouchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 10/816,644

(22) Filed: Apr. 2, 2004

(65) Prior Publication Data

US 2004/0252242 A1    Dec. 16, 2004

(30) Foreign Application Priority Data

Apr. 4, 2003    (JP)    ............................. 2003-102354

(51) Int. Cl.
*H04N 9/74*    (2006.01)

(52) U.S. Cl. ...................... 348/578; 348/590; 348/591; 348/597

(58) Field of Classification Search ................ 348/578, 348/581–582, 584–587, 590, 592–597, 722, 348/591; 345/501; *H04N 9/74*
See application file for complete search history.

(56) References Cited

U.S. PATENT DOCUMENTS

| | | | | |
|---|---|---|---|---|
| 4,392,156 A | * | 7/1983 | Duca et al. | ................. 348/597 |
| 4,409,618 A | * | 10/1983 | Inaba et al. | ................. 348/590 |
| 4,646,154 A | * | 2/1987 | Shinohara et al. | .......... 348/590 |
| 4,961,114 A | * | 10/1990 | White | ......................... 348/597 |
| 5,384,912 A | * | 1/1995 | Ogrinc et al. | ................ 345/501 |
| 5,835,159 A | * | 11/1998 | Kobayashi | .................. 348/579 |
| 6,226,048 B1 | * | 5/2001 | Tachibana | ................... 348/590 |

FOREIGN PATENT DOCUMENTS

| | | |
|---|---|---|
| JP | 5-236347 | 9/1993 |
| JP | 7-307897 | 11/1995 |
| JP | 11-55567 | 2/1999 |

* cited by examiner

*Primary Examiner*—Trang U. Tran
(74) *Attorney, Agent, or Firm*—Frommer Lawrence & Haug LLP; William S. Frommer; Paul A. Levy

(57) ABSTRACT

A key signal control unit for controlling the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to a video signal. A totally new image special effect is thus made on the video signal.

2 Claims, 12 Drawing Sheets

SPECIAL EFFECT DEVICE, KEY SIGNAL CONTROL DEVICE AND KEY SIGNAL CONTROL METHOD

BACKGROUND OF THE INVENTION

1. Field of the Invention

This invention relates to image special effects, and particularly to a special effect device, a key signal control device and a key signal control method used for an editing system capable of performing non-linear editing.

This application claims priority of Japanese Patent Application No.2003-102354, filed on Apr. 4, 2003, the entirety of which is incorporated by reference herein.

2. Description of the Related Art

At broadcasting stations and production departments for image contents such as postproduction, material video data and audio data are generally edited by using a non-linear editing device and contents such as television programs, commercials or movies are thus produced.

As a non-linear editing device, a computer (workstation or personal computer) in which editing application software is installed has been conventionally used.

In such a non-linear editing device, a material of desired scenes is captured from a VTR, video camera or the like that recorded the material into a storage device connected with the computer or a built-in hard disk of the computer.

Then, editing processing is performed by the computer having the editing application software, such as image special effects (hereinafter referred to as special effects) on the captured material, or synthesis or connection of the captured material of one workstation with another material. A video content is thus produced (see, for example, Patent Reference 1).

Patent Reference 1: JP-A-2003-37806

The special effects made by such a non-linear editing device include a special effect called border effect, which is like bordering an image. The border effect is often made together with a special effect called softness that restrains contrast of image at the bordered part. As the border effect and softness are made simultaneously, an effectively bordered image can be provided.

SUMMARY OF THE INVENTION

It is an object of this invention to provide a special effect device, a key signal control device and a key signal control method that provide a totally new effect in the border effect processing.

To achieve the foregoing object, a special effect device according to this invention is adapted for providing a desired special effect to a video signal on the basis of a key signal. The special effect device includes: a key signal control unit for controlling the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to the video signal; and a video signal processing unit for changing the video signal on the basis of the key signal.

To achieve the foregoing object, a key signal control device according to this invention includes a key signal control unit for controlling the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to a video signal.

To achieve the foregoing object, a key signal control method according to this invention includes a key signal control step of controlling the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to a video signal.

According to this invention, the key signal control unit controls the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to a video signal, and the video signal is changed on the basis of the key signal. Thus, a totally new image special effect can be provided to the video signal by real-time processing.

Moreover, according to this invention, the influence of a Mach effect generated in the special effect made on the video signal can be restrained.

DESCRIPTION OF THE PREFERRED EMBODIMENT

Figure 1:
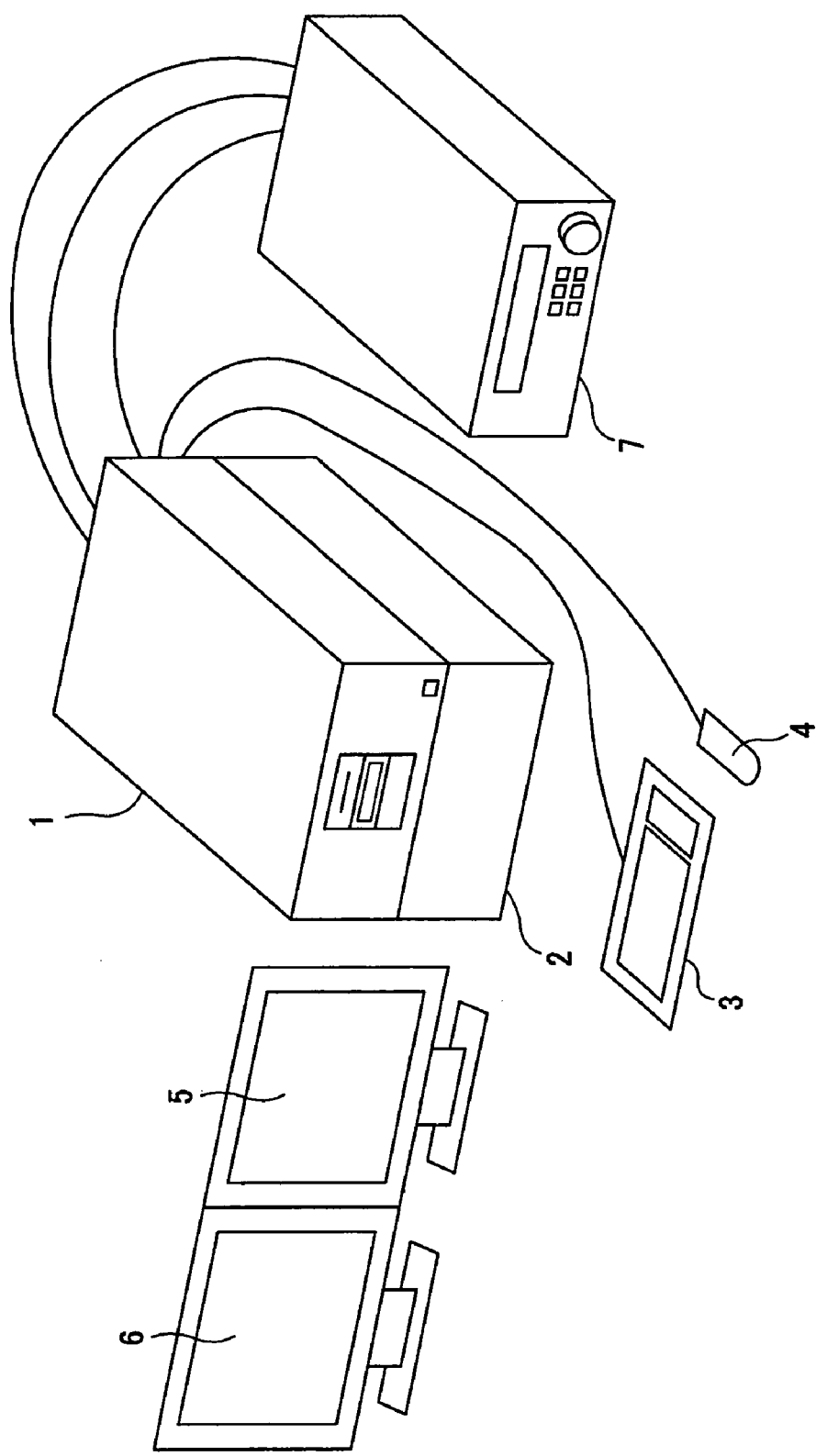
FIG. 1 is a view for explaining the structure of an editing system as an embodiment of this invention.

An embodiment of the special effect device, the key signal control device and the key signal control method according to this invention will now be described in detail with reference to the drawings. An editing system as an embodiment of this invention will be described with reference to FIG. 1.

The editing system has a workstation 1, a storage device 2, a keyboard 3, a mouse 4, VGA (video graphic array) monitors 5, 6, and a VTR 7.

In the workstation 1, editing application software for capturing and editing materials is installed. It is used as a non-linear editing device.

The storage device 2 is, for example, a large-capacity solid-state disc. It is used as a peripheral storage device when the workstation 1 captures materials.

The keyboard 3, mouse 4, and VGA monitors 5 and 6 are input/output devices of the workstation 1. These are used by a user for operating the workstation 1 to perform an editing operation or to confirm the result of editing.

The VTR 7 is a VTR of a model corresponding to the HDCAM format ("HDCAM" is a registered trademark). It is used for recording non-compressed HDTV data (materials) supplied from a HDTV camera and the like at a reporting site.

In the HDCAM format, an HDTV signal is compressed to approximately 1/7 by a band limiting technique and a bit reduction technique. Therefore, two HDTV video data compressed in this format can be simultaneously transferred from the computer to PCI cards via PCI buses.

From the VTR 7, desired HDTV data of the recorded HDTV data of the HDCAM format is captured into the storage device 2 by a capture operation at the workstation 1.

Figure 2:
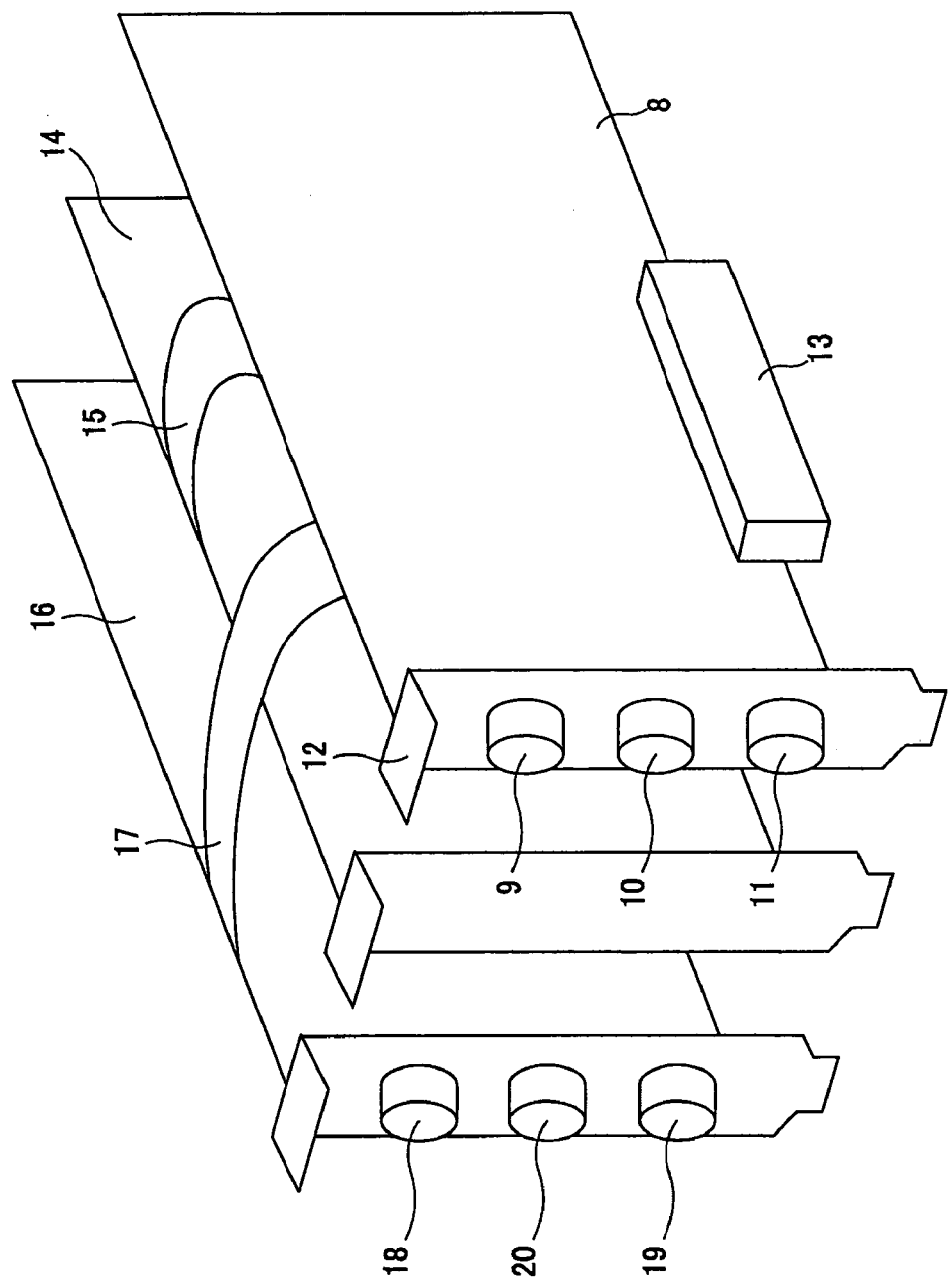
FIG. 2 is a view for explaining the outer structures of PCI cards loaded in a workstation.

Three PCI cards are loaded in PCI slots of the workstation 1. FIG. 2 schematically shows the outer structures of these three PCI cards 8, 14 and 16.

The PCI card 8 is a PCI card for inputting/outputting HDTV data and decoding HDTV video data of the HDCAM format (hereinafter referred to as "HD compressed data"). The PCI card 8 has a PCI connector for fitting with a board (hereinafter referred to as "mother board") having a PCI slot in the computer, and a mechanical part 12 for screwing and fixing to the computer.

The PCI card 8 also has an input connector 9 for a reference signal, an input connector 10 for non-compressed HDTV data, and an output connector 11 for non-compressed HDTV data, as connectors for directly inputting and outputting signals from and to the outside without transmitting the signals via the computer.

The PCI card 14 is a PCI card mainly for inputting/outputting HDTV data, decoding HD compressed data, and performing editing processing of HDTV data. Also the PCI card 14 has the same PCI connector as the PCI card 8 (though not shown in FIG. 2, it is a PCI connector 25 shown in FIG. 3, which will be described later), and a mechanical part for fixing.

The PCI card 16 is a PCI card for inputting/outputting SDTV data. Also the PCI card 16 has the same PCI connector as the PCI card 8 (though not shown in FIG. 2, it is a PCI connector 40 shown in FIG. 3, which will be described later).

The PCI card 16 also has an input connector 18 for a reference signal, an input connector 19 for non-compressed SDTV data, and an output connector 20 for non-compressed SDTV data, as connectors for directly inputting and outputting signals from and to the outside without transmitting the signals via the computer.

The PCI card 8 and the PCI card 14 have connectors for transmitting and receiving HDTV data to and from each other (though not shown in FIG. 2, these are connectors 24 and 29 shown in FIG. 3, which will be described later). These connectors are connected by a cable 15.

The PCI card 8 and the PCI card 16 have ports for transmitting and receiving SDTV data to and from each other (though not shown in FIG. 2, these are ports 33 and 38 shown in FIG. 3, which will be described later). These ports are connected by a cable 17.

Figure 3:
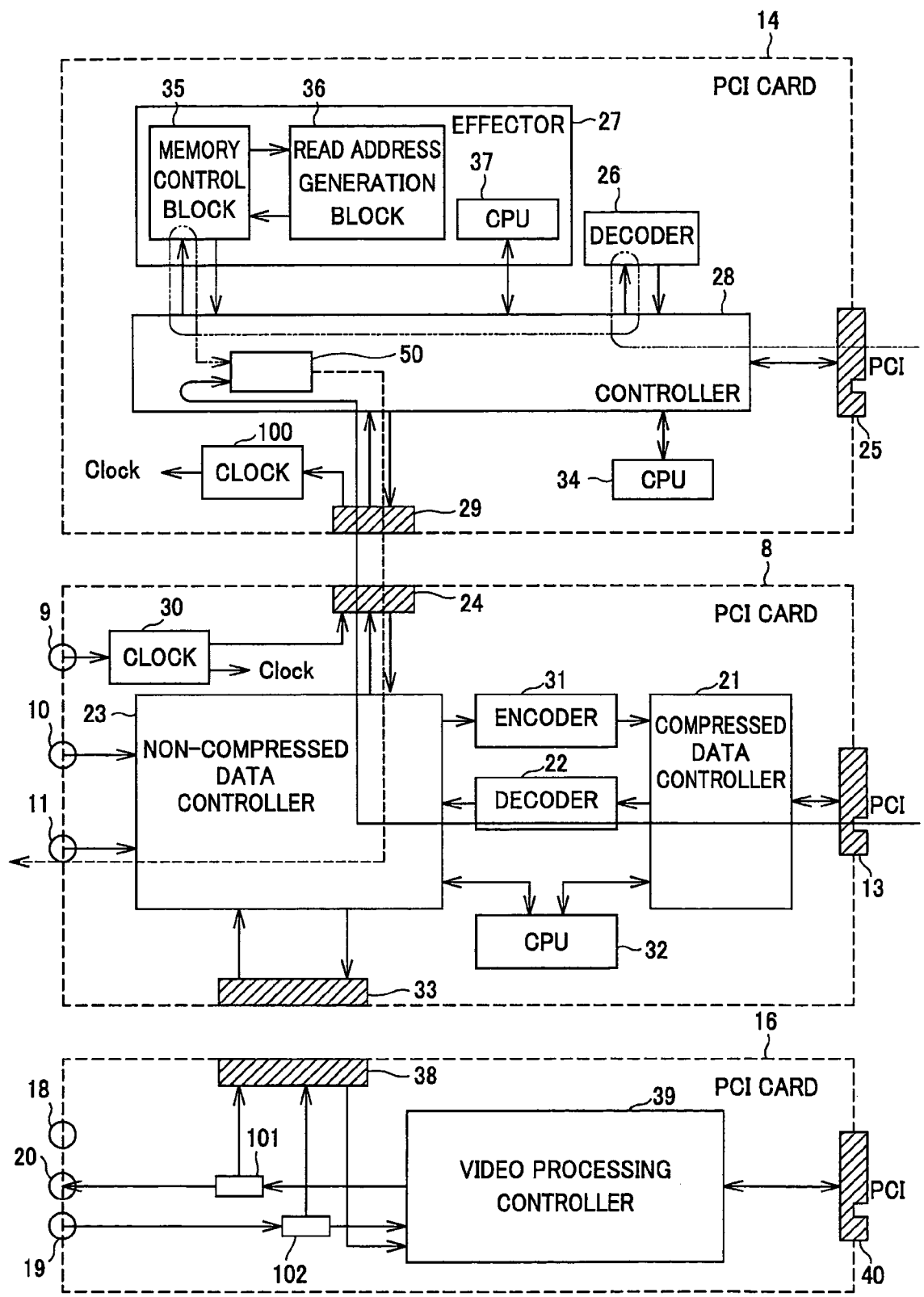
FIG. 3 is a view for explaining the structures of the PCI cards loaded in the workstation.

FIG. 3 is a block diagram showing the circuit structures of the PCI cards 8, 14 and 16.

The PCI card 8 is equipped with a compressed data controller 21, a decoder 22, a non-compressed data controller 23, a clock generator circuit 30, an encoder 31, and a CPU 32 for controlling each part of the PCI card 8.

The compressed data controller 21 is a circuit for controlling the PCI bus in the workstation 1 and controlling input/output of HD compressed data via the PCI connector 13, which is also shown in FIG. 2. The HD compressed data inputted to the compressed data controller 21 is sent to the decoder 22.

The decoder 22 is a circuit for decoding (expanding) HD compressed data to restore non-compressed HDTV video data. The HDTV video data decoded by the decoder 22 is sent to the non-compressed data controller 23.

The non-compressed data controller 23 is a circuit for controlling input/output of HDTV data via the input connector 10 and the output connector 11, which are also shown in FIG. 2, and the connector 24 (for transmitting and receiving HDTV data to and from the PCI card 14), and for controlling input/output of SDTV data via the port 33 (for transmitting and receiving SDTV data to and from the PCI card 16). Although not shown, a converter for converting the signal system between HDTV and SDTV is provided in the non-compressed data controller 23.

The clock generator circuit 30 is a circuit for generating a clock signal from a reference signal inputted form the input connector 9, which is also shown in FIG. 2, and supplying the clock signal to each part of the PCI card 8.

The encoder 31 is a circuit for encoding (compressing) non-compressed HDTV video data sent from the non-compressed data controller 23 into the HDCAM format. From the encoder 31, the encoded HDTV video data (HD compressed data) is sent to the compressed data controller 21.

The PCI card 14 is equipped with a decoder 26, an effector 27, a controller 28, a CPU 34 for controlling each part of the PCI card 14, and a block generator circuit 100.

Like the decoder 22 of the PCI card 8, the decoder 26 is a circuit for decoding HD compressed data to restore non-compressed HDTV video data. Although not shown, the decoder 26 and the decoder 22 may be provided on the same board.

The effector 27 is a circuit for making a special effect on non-compressed HDTV video data.

The controller 28 is a circuit for controlling input/output of HD compressed data via the PCI connector 25 and for transmitting and receiving HDTV video data to and from the decoder 26, effector 27 and connector 29.

The PCI card 16 is equipped with a video processing controller 39. The video processing controller 39 is a circuit for controlling input/output of non-compressed SDTV data via the PCI connector 40, input connector 19, output connector 20 and port 38 (port for transmitting and receiving non-compressed SDTV data to and from the PCI card 8).

In this editing system, data acquired by performing image angle change of the result of synthesis by the PCI card 14 to SD data by the non-compressed data controller 23 of the PCI card 8 is sent to the port 38 via the port 33 of the PCI card 8.

The data can be confirmed on the monitor connected to the port and output connector 20 under the control of the video processing controller 39. Moreover, the video data and audio data can be transmitted to the storage device 2 or the like via the video processing controller 39 and the PCI connector 40.

A switch 101 is a switch for switching to output data sent from the video processing controller 39 to outside on a SDI cable via the output connector 20 or to output the data to the PCI card 8 via the port 38.

A switch 102 is a switch for selecting either a signal sent from the input connector 19 or a signal sent via the port 38 and then outputting the selected signal to the video processing controller 39.

Figure 4:
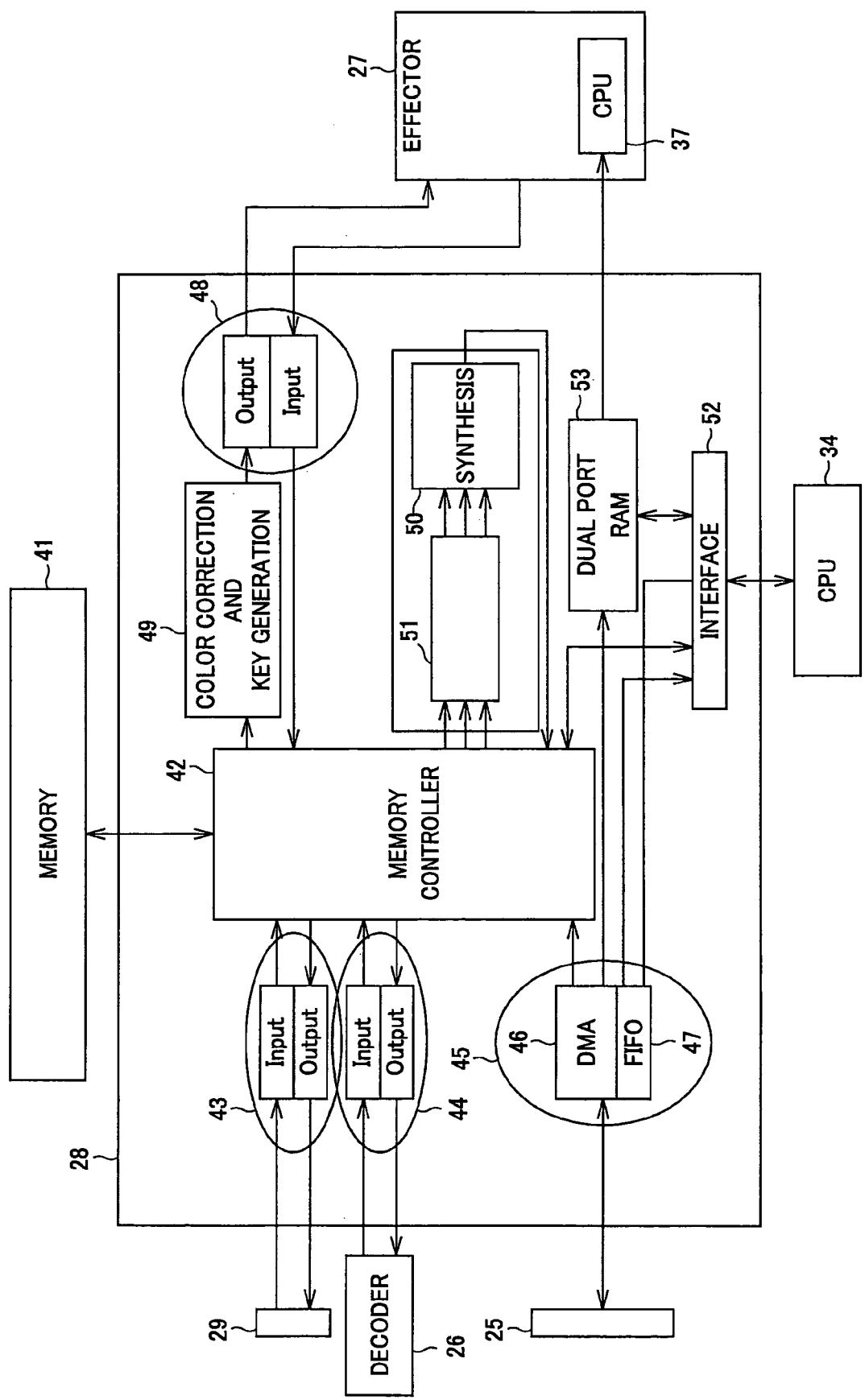
FIG. 4 is a block diagram for explaining the structure of a controller provided in the PCI card.

FIG. 4 is a block diagram showing the circuit structure of the controller 28 of the PCI card 14. The controller 28 is connected with a memory 41 (for example, SDRAM or SRAM) having a capacity of several hundred megabytes for temporarily storing HDTV video data. The controller 28 has a memory controller 42 for controlling the memory 41, input/output ports 43, 44, 48, a DMA (direct memory access) controller 46, a FIFO (first-in first-out) circuit 47, a color correction and key generator circuit 49, a synthesizer circuit 50, which is also shown in FIG. 3, an interface 52, and a dual port RAM 53.

The input/output port 43 is a port for transmitting and receiving non-compressed HDTV video data between the connector 29 and the memory controller 42.

The input/output port 44 is a port for sending HD compressed data from the memory controller 42 to the decoder 26 and for sending non-compressed HDTV video data from the decoder 26 to the memory controller 42.

The input/output port 48 is a port for sending non-compressed HDTV video data from the color correction and key generator circuit 49 to the effector 27 and for sending HDTV video data from the effector 27 to the memory controller 42.

The interface 52 is an interface between the CPU 34 and each part of the controller 28. (In FIG. 4, lines connecting each part and the interface 52 are not shown, except for the memory controller 42, FIFO circuit 47 and dual port RAM 53.)

The DMA controller 46 functions to send HD compressed data inputted via the PCI connector 25 to the memory controller 42 and to write an effect parameter inputted via the PCI connector 25 to the dual port RAM 53.

The FIFO circuit 47 is a buffer for sending a command inputted via the PCI connector 25 to the CPU 34 and for sending a status from the CPU 34 via the PCI connector 25.

The color correction and key generator circuit 49 is a circuit for performing color correction processing, luminance key generation processing to generate a key signal (signal indicating transparency) from a luminance signal, and chroma key generation processing to generate a key signal from a specific chrominance component, with respect to non-compressed HDTV video data sent from the memory controller 42.

The key signals generated by the color correction and key generator circuit 49 are sent to the effector 27 via the input/output port 48. The effector 27 executes predetermined effect processing based on the key signals sent thereto. In the case of executing border effect processing along with softness, which will be described later, the effector 27 performs effect processing based on the key signals generated by the color correction and key generator circuit 49.

The synthesizer circuit 50 is a circuit for synthesizing two non-compressed HDTV video data sent from the memory controller 42 on the basis of the key signals. The HDTV video data synthesized by the synthesizer circuit 50 is sent back to the memory controller 42.

On a stage preceding the synthesizer circuit 50, a block 51 capable of performing color correction and generating a key signal on each layer before synthesis is provided.

The dual port RAM 53 is used by the CPU 37 in the effector 27 for reading out an effect parameter written by the DMA controller 46 and is used by the CPU 34 or the CPU 37 for writing and reading various kinds of information that should be transmitted and received between each other.

Figure 5:
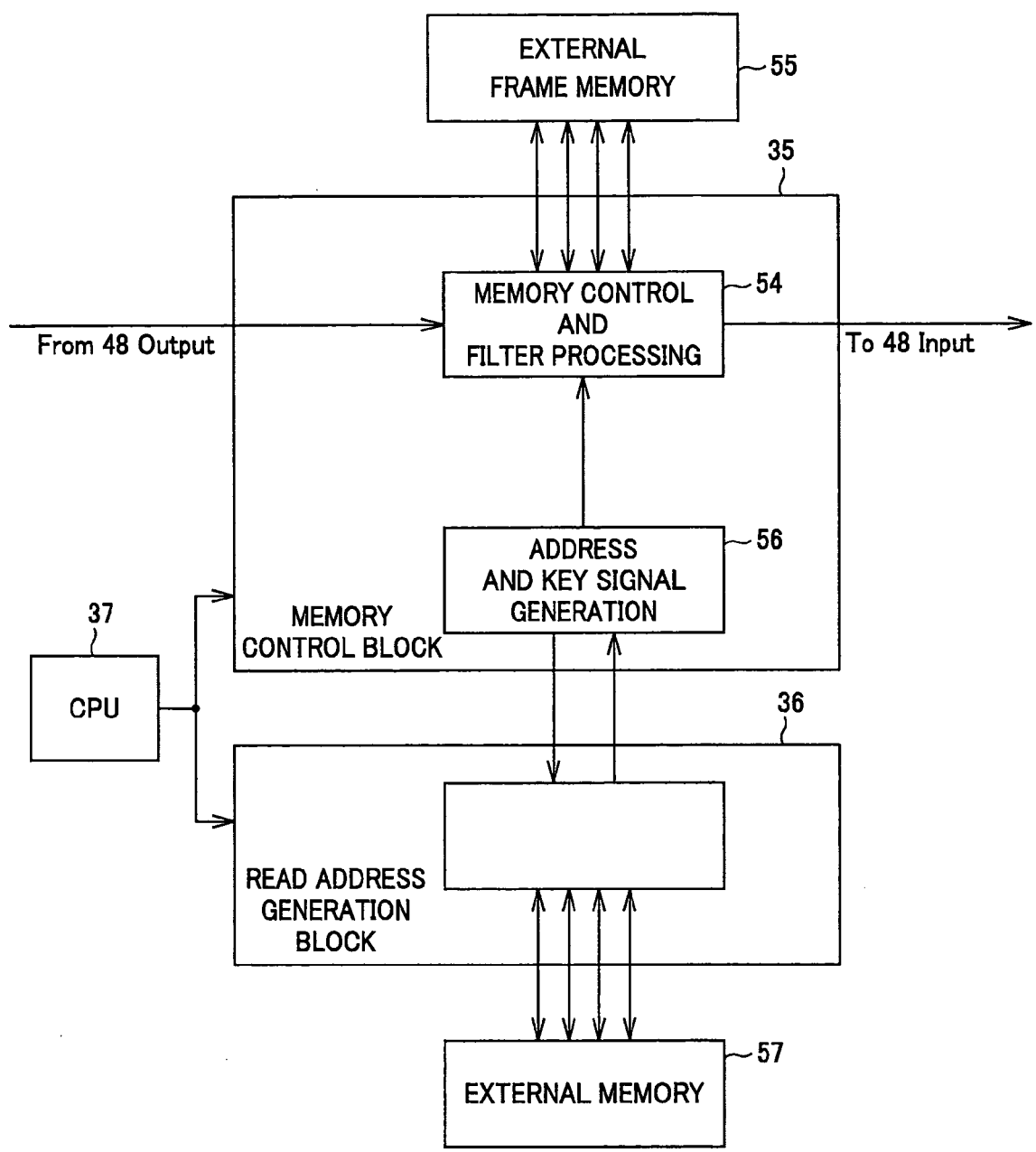
FIG. 5 is a block diagram for explaining the structure of an effector provided in the PCI card.

FIG. 5 is a block diagram showing the circuit structure of the effector 27 of the PCI card 14. As shown in FIG. 3, too, the effector 27 includes a memory control block 35, a read address generation block 36, and the CPU 37 for controlling these blocks.

The memory control block 35 is connected with an external frame memory 55. The memory control block 35 includes a memory control and filter processing circuit 54, and an address and key signal generator circuit 56.

The memory control and filter processing circuit 54 is a circuit for controlling the external frame memory 55 and for performing anti-aliasing by filter processing.

The address and key signal generator circuit 56 is a circuit for providing a write address and read address for each data of one pixel to the memory control and filter processing circuit 54 and for generating a key signal indicating a boundary at the time of scene change (for example, a circular frame displaying the subsequent scene gradually expands in the previous scene at the time of scene change) and providing the key signal to the memory control and filter processing circuit 54.

The read address generation block 36 is connected with an external memory 57. The read address generation block 36 is a block for performing arithmetic processing such as addition, multiplication, and conversion of an orthogonal coordinate to a polar coordinate on the basis of the type and effect parameter of a special effect selected and set by a special effect selection button based on the editing application software installed in the workstation 1 while transmitting and receiving data to and from the external memory 57 at a speed of 100 MHz or more, and thus generating a read address (X', Y') for each data of one pixel.

When non-compressed HDTV video data or SDTV video data of one frame is sent from the controller 28 to the effector 27 via the input/output port 48 (FIG. 4), the video data is sequentially written to the external frame memory 55 via the memory control and filter processing circuit 54 in accordance with a write address (X, Y) from the address and key signal generator circuit 56.

Then, the read address (X', Y') generated by the read address generation block 36 is transmitted to the address and key signal generator circuit 56 in the memory control block 35, and the HDTV video data or SDTV video data is sequentially read out from the external frame memory 55 via the memory control and filter processing circuit 54 in accordance with the read address (X', Y'). Image modification processing is thus performed on the HDTV video data or SDTV video data.

The HDTV video data or SDTV video data read out from the frame memory 55 is sent to the input/output port 48 in the controller 28 from the memory control and filter processing circuit 54.

As HDTV video data or SDTV video data of each frame sent from the controller 28 is processed in this manner by the effector 27, for example, a special effect to make a scene disappear in such a manner as if a page were turned, or a special effect such as the above-described border effect along with softness, is made on the HDTV video data or SDTV video data.

The video data processed for the special effect by the effector 27 is supplied to the synthesizer circuit 50 of the controller 28 and is synthesized with non-compressed data supplied from the PCI card 8. The video data, processed for the special effect and then synthesized, is sent to the PCI card 8. The processed video can be confirmed in real time on the monitor connected to the output connector 11.

A special effect that produces a totally new effect proposed by the present applicant in the editing system as the embodiment of this invention will now be described. This special effect proposed by the present applicant will be called round crop hereinafter.

The round crop provides a totally new special effect to an image if it is performed in the case of making a border effect along with softness. The round crop can also restrain a Mach effect generated by making a border effect along with softness. The Mach effect will be described later.

First, a typical border effect along with softness will be described.

Figure 6:
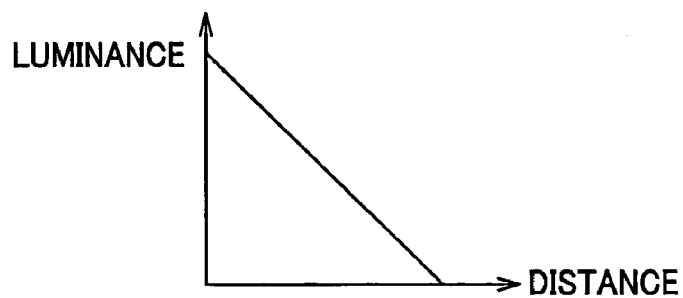
FIG. 6 is a view for explaining a luminance signal in the case of providing softness.

To provide softness on video data, the luminance can be decreased with a predetermined slope as shown in FIG. 6 in an area where softness is to be provided. Therefore, it can be understood that, in order to provide softness on video data by the effector 27, the output level of a key signal generated from a luminance signal by the color correction and key generator circuit 49 can have the predetermined slope shown in FIG. 6.

Figure 7:
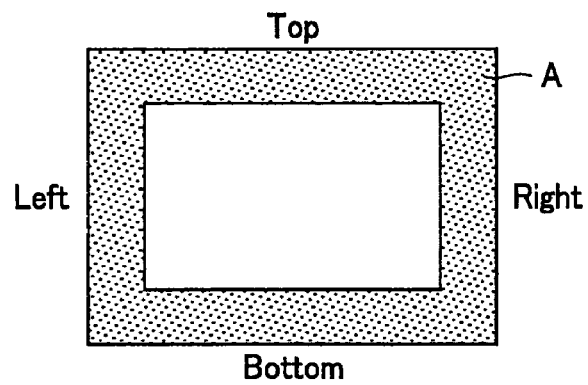
FIG. 7 is a view for explaining an area where a border effect is made.

Therefore, in the case of providing softness in a border effect, the output level of the key signal in a shaded area A on a screen shown in FIG. 7, that is, a border area where a border effect is to be made, is caused to have a slope as described above.

Now, a procedure for generating a key signal used in the case of making a border effect along with softness will be described with reference to FIGS. 8A to 8D using solid figures.

Figure 8A:
FIGS. 8A to 8D are views for explaining a procedure for generating a key signal in the case of making a border effect along with softness.

In FIG. 8A, a key signal expressed as a plane having a predetermined slope is generated in four directions of top, bottom, left and right on the screen.

The four directions of top, bottom, left and right on the screen correspond to the top, bottom, left and right shown in FIG. 7. In each direction, a key signal having a predetermined slope as shown in FIG. 8A is generated. Since the key signal in each direction is generated in the direction of width and height of the image, it can be considered as a plane.

Figure 8B:
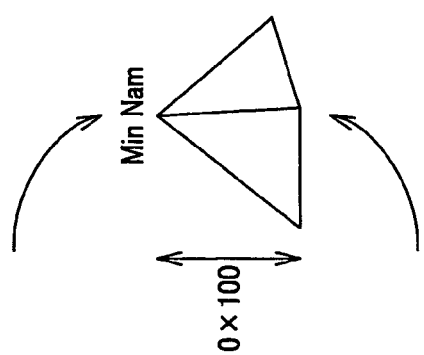

In FIG. 8B, the key signals expressed as planes are classified by left/right and top/bottom and the classified key signals are combined. In this case, the maximum value of the key signal level is adjusted to the lower key signal level. This processing provides images of triangular poles formed by the above-described planes based on the key signals.

Figure 8C:
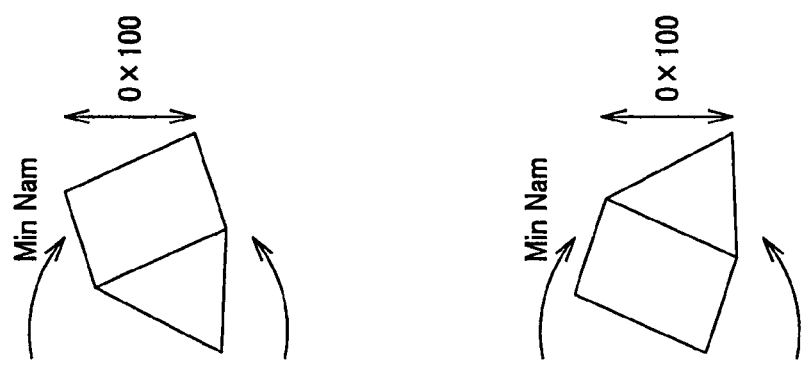

In FIG. 8C, the two triangular poles generated by the above-described processing of FIG. 8B are combined together. In this case, the maximum value of the key signal level is adjusted to the lower key signal level. This processing provides an image of a rectangular pyramid formed by the above-described planes based on the key signals.

Figure 8D:
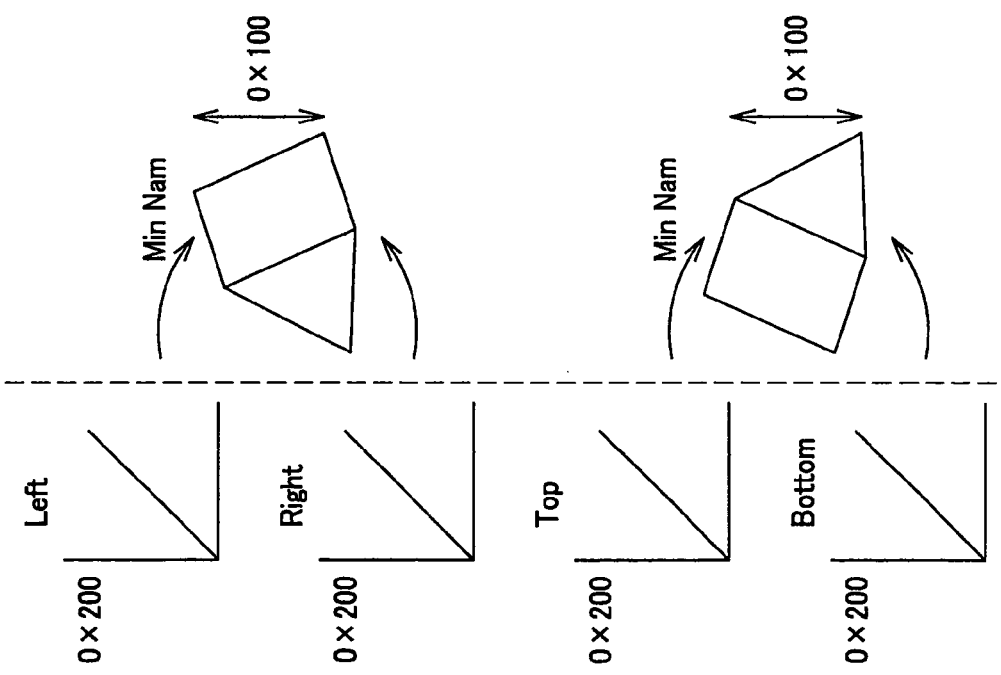

In FIG. 8D, limit processing is performed on the key signals when necessary. The limit processing provides an image of a trapezoid formed from the rectangular pyramid generated by the processing of FIG. 8C.

Figure 9:
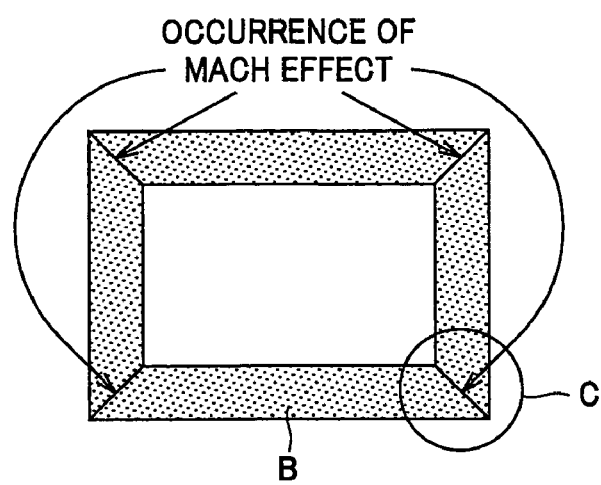
FIG. 9 is a view showing an output image of the key signal in the case of making a border effect along with softness.

As the rectangular pyramid generated in this manner from the planes of the key signals is viewed from right above, the output of the key signal provides an image as shown in FIG. 9. A shaded area B is an area where a border effect is made along with softness.

In the area B in the output image screen of the key signal shown in FIG. 9, lines extending from the four corners toward the center are outputted. These are images of visually recognized linear outputs based on a Mach effect.

The Mach effect is such a phenomenon that a high-luminance part in a boundary part of steps is perceived as having higher luminance than the actual luminance while a low-luminance part is perceived as having lower luminance than the actual luminance. It has a contour emphasizing effect.

For example, if there is a black area on a white background, the human vision perceives higher contrast near the boundary between the black area and the white background than in the other areas, even when the white background and the black area have uniform luminance.

Figure 10:
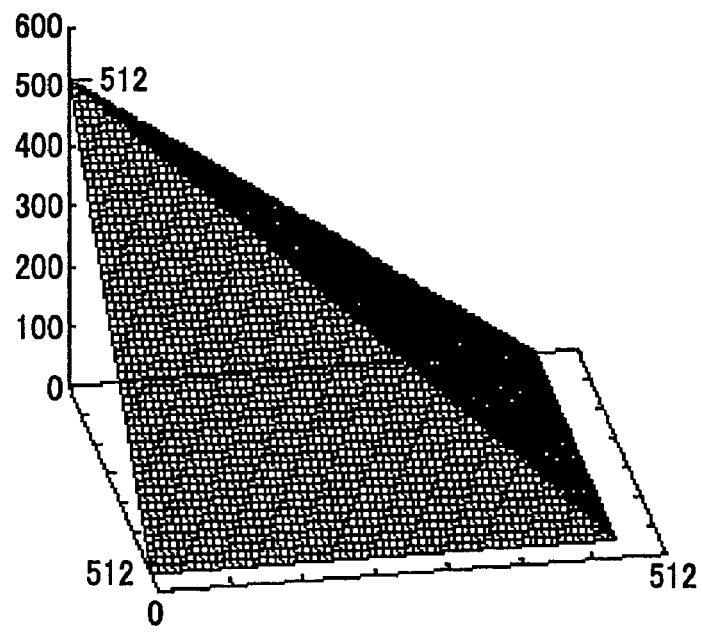
FIG. 10 is a view showing a stereoscopically plotted key signal output.
Figure 11:
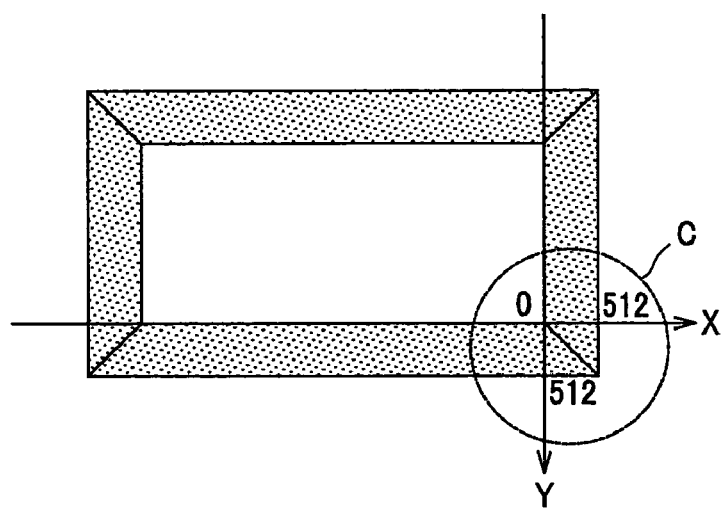
FIG. 11 is a view or explaining an orthogonal coordinate system having a KeyMax position as its origin.

FIG. 10 shows a stereoscopic image of the output of the key signal in an area C shown in FIG. 9. In FIG. 10, the limit KeyMax of the output level in the limit processing of FIG. 8D is set at KeyMax=512. In FIG. 10, an orthogonal coordinate system (X, Y) having the position of KeyMax as its origin, as shown in FIG. 11, is assumed. The position where KeyMax=512 is reached is the inner edge of the area where a border effect is to be made, indicated by a bold line in FIG. 11.

As shown in FIG. 10, the ridgelines of the rectangular pyramid are distinctly recognized as the output of the key signal. This indicates the influence of the Mach effect.

The Mach effect can be avoided by assuming that the origin of the orthogonal coordinate system shown in FIG. 11 exists all the positions where KeyMax is 512 and calculating the following equation (1) in the case where each position within the area where a border effect is to be made is specified by the orthogonal coordinate system defined by the nearest origin.

$$BorderKey = KeyMax - \frac{\sqrt{X^2 + Y^2}}{\sqrt{2}} \begin{pmatrix} 0 \le X \le 512 \\ 0 \le Y \le 512 \end{pmatrix} \quad (1)$$

$$KeyMax = 512$$

In the orthogonal coordinate system shown in FIG. 11, KeyMax is 512 and the maximum values of both X and Y of the coordinate (X, Y) are 512, too.

In the equation (1), a value subtracted from KeyMax is value obtained by normalizing the distance of the position (X, Y) from the origin in the orthogonal coordinate system within the area where a border effect is to be made, with the square root of 2. Therefore, the equation (1) changes the output level of the key signal in accordance with the distance from the origin in the orthogonal coordinate system, that is, converts the key signals at the same distance from the origin to the same key signal level.

Figure 12:
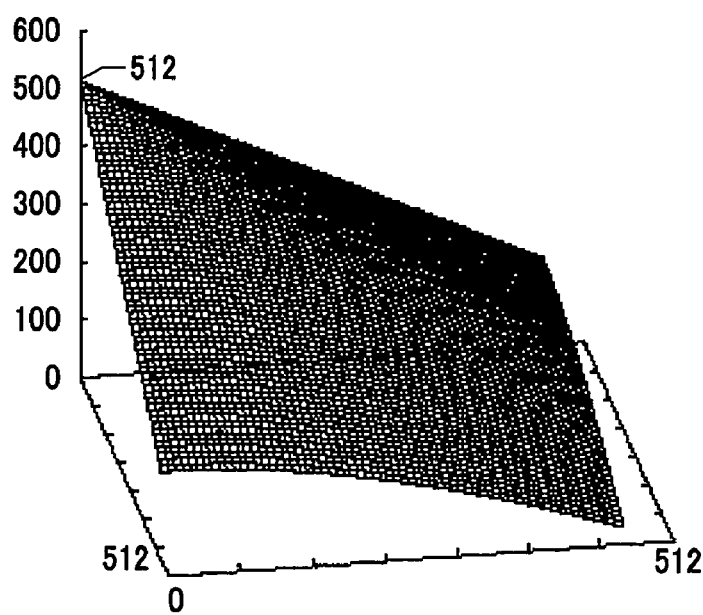
FIG. 12 is a view showing a key signal generated by an equation (1) and plotted stereoscopically.

FIG. 12 shows plotted output values (BorderKey) of the key signal using the equation (1). From FIG. 12, it can be understood that the ridgelines of the rectangular pyramid shown in FIG. 10 disappeared while a gentle curved surface has emerged.

Figure 13:
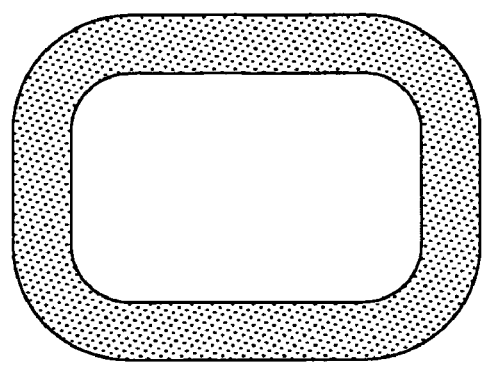
FIG. 13 is a view showing the state of the key signal generated by the equation (1).

FIG. 13 shows the state of this rectangular pyramid as viewed from right above, in the case where the equation (1) is calculated for all the ridgelines of the rectangular pyramid. From FIG. 13, it can be understood that the influence of the Mach effect on the key signal has completely eliminated and a key signal which is different from the key signal in the case of simply making a border effect along with softness is provided.

Instead of the equation (1), the following equation (2) may be used.

$$BorderKey = fx\left(KeyMax - \frac{\sqrt{X^2+Y^2}}{\sqrt{2}}\right)\left(\begin{array}{c}0 \le X \le 512 \\ 0 \le Y \le 512\end{array}\right) \quad (2)$$

$$KeyMax = 512$$

In the equation (2), a function fx(z) using the equation (1) as a variable z is used. The function fx(z) is a generally known equation. As a simple example, fx(z)=z, fx(z)=a×z (where a is a predetermined constant), or fx(z)=a+z (where a is a predetermined constant) is used. By arbitrarily changing the function fx(z), it is possible to generate a border area where the output value of the key signal has various slopes.

Figure 14:
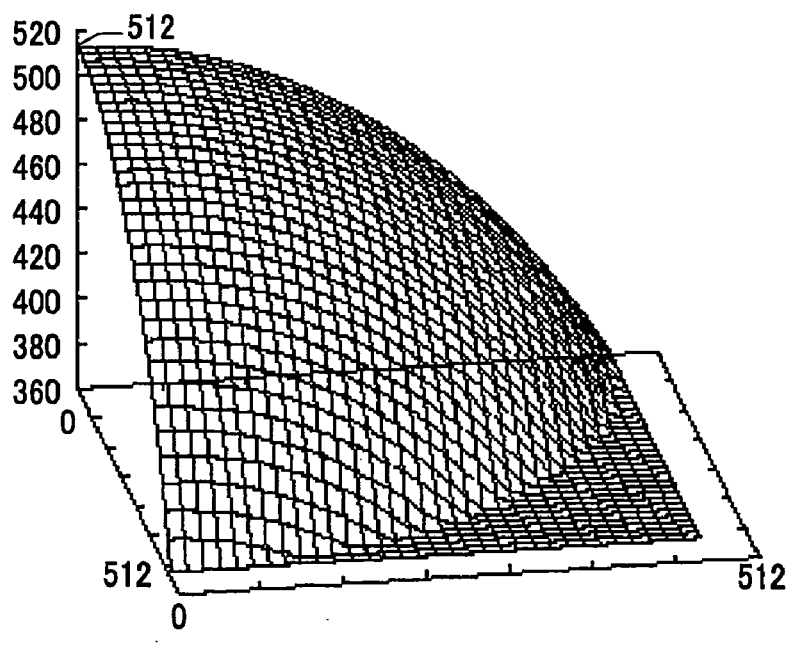
FIG. 14 is a view showing a key signal generated by an equation (2) and plotted stereoscopically.

FIG. 14 shows plotted output values (BorderKey) of the key signal based on the equation (2). In FIG. 14, the influence oh the Mach effect has been eliminated as in the case of the plotted output values of the key signal shown in FIG. 12. In FIG. 14, it can be seen that the curved surface of the solid based on the output values of the key signal is more rounded than the curved surface shown in FIG. 12.

The constant a in the function fx(z)=a×z or fx(z)=a+z may be KeyMax. For example, if a in fx(z)=a+z is KeyMax, a key signal of a constant level can be outputted irrespective of the distance because fx(z) will not be an output level equal to or more than KeyMax. In this case, the plotted output values of the key signal based on the equation (2) shown in FIG. 14 present a plane instead of the rounded curved surface.

Therefore, it can be understood that a further special effect can be provided by using the equation (2). The special effect made on the basis of the key signal generated by the equation (1) or (2) is an example of the round crop proposed by the present applicant.

Figure 15:
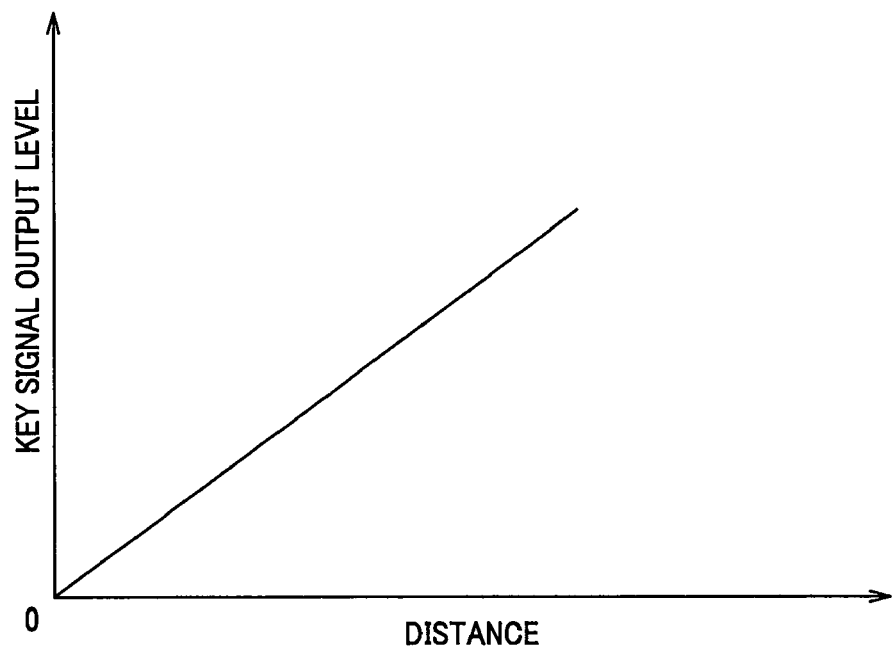
FIG. 15 is a view showing the output level of a key signal that is monotonically increasing in a frame area.
Figure 16:
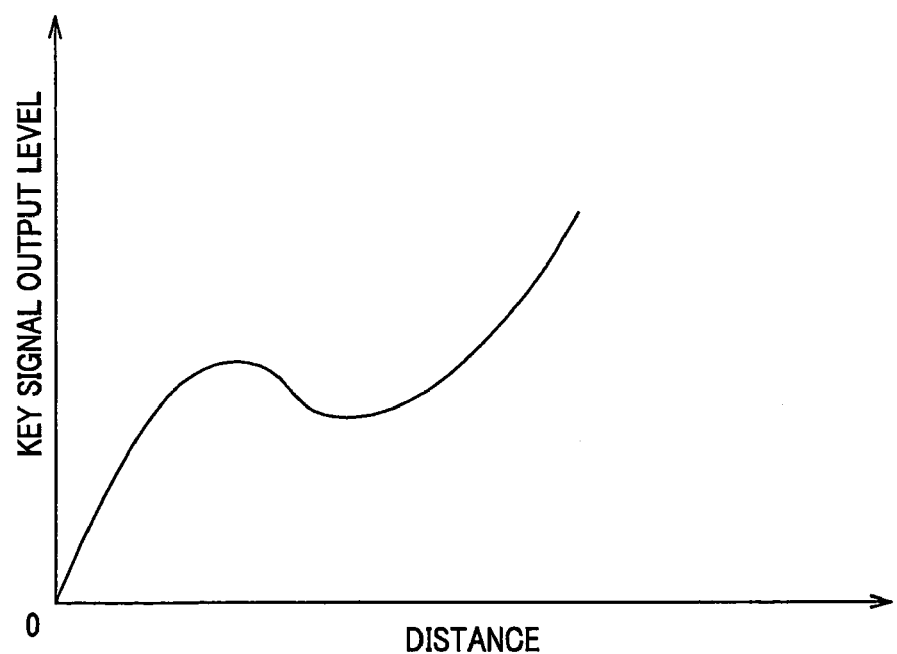
FIG. 16 is a view showing the output level of a key signal represented by a predetermined function in a frame area.

The round crop proposed by the present applicant can be applied not only to the case where the output level of the key signal monotonically decreases within a frame area along the outer circumference of an image on the basis of the inner edge of the frame area as a reference, as described above, but also to the case where the output level of the key signal monotonically increases as shown in FIG. 15 or changes in accordance with various curves (for example, cubic curve) defined by a function as shown in FIG. 16.

Moreover, the round crop can be applied not only to the case where the output level of the key signal decreases or increases as described above, but also to the case where the output level of the key signal does not change at all and has a constant value.

To perform the round crop in the case where the output level of the key signal increases as described above, for example, the value of the output of the equation (1) and the value of the variable z in the equation (2) may be an absolute value. In this case, KeyMax in the equations (1) and (2) is the output level of the key signal on the inner edge of the frame area along the outer circumference of the image, which is the reference of the output level of the key signal.

Now, the hardware structure of the color correction and key generator circuit 49 for executing arithmetic processing based on the equations (1) and (2) will be described. To calculate the equations (1) and (2), the color correction and key generator circuit 49 has a hardware structure shown in FIG. 17.

Figure 17:
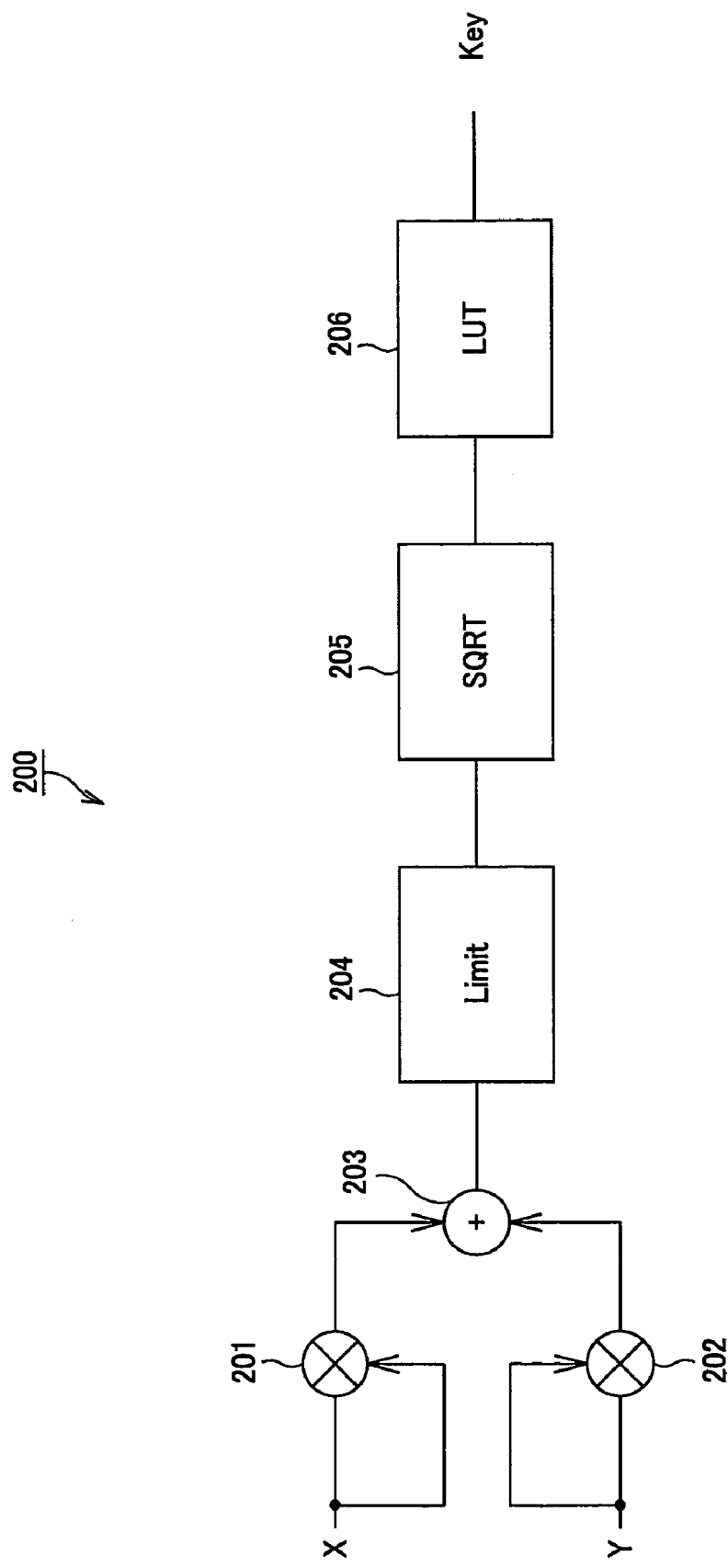
FIG. 17 is a block diagram showing a hardware structure for executing the equations (1) and (2).

As shown in FIG. 17, the color correction and key generator circuit 49 has multipliers 201, 201, an adder 203, a limit circuit 204, a SQRT circuit 205, and a LUT (lookup table) 206.

The position (X, Y) in the orthogonal coordinate system shown in FIG. 11 is inputted to each of the multipliers 201, 202 and then multiplied. The adder 203 adds the outputs from the multipliers 201, 202. The limit circuit 204 performs predetermined limit processing to the output from the adder 203. The SQRT circuit 205 divides the output from the limit circuit 204 by 2 and calculates the square root. The output of the SQRT circuit 205 is subtracted from KeyMax obtained by the color correction and key generator circuit 49, though not shown. The result is supplied to the LUT 206. The LUT 206 is a memory in which the functions fx(z) to be used in the equation (2) are stored. A function fx(z) designated by the CPU 34 is read out and the output from the SQRT circuit 205 is inputted to the read-out function fx(z).

In this manner, a round crop circuit 200 executes the arithmetic processing expressed by the equation (1) or (2) and controls the output level of the key signal to realize the round crop.

The LUT 206 may be a ROM (read-only memory) in which the functions fx(z) are stored in advance, or may be an SRAM (static random access memory) or DRAM (dynamic random access memory) in which the function fx(z) can be set by the CPU 34.

The key signal with its output level controlled by the round crop circuit 200 of the color correction and key generator circuit 49 is outputted to the effector 27 via the input/output port 48. The effector 27 performs real-time effect processing by changing the luminance signal and color signal of the video data on the basis of the key signal with its output level controlled by the round crop circuit 200 of the color correction and key generator circuit 49.

In this manner, as the effector 27 in the PCI card 14 provided at the workstation 1 performs effect processing based on a key signal with its output level controlled by the round crop circuit 200 of the color correction and key generator circuit 49, the editing system can perform the round crop that provide a totally new image special effect on video data.

As described above, the round crop circuit 200 can control the output level of an already generated key signal, in addition to controlling the output level of a key signal generated by the color correction and key generator circuit 49.

While the invention has been described in accordance with a certain preferred embodiment thereof illustrated in the accompanying drawings and described in the above description in detail, it should be understood by those ordinarily skilled in the art that the invention is not limited to the embodiment, but various modifications, alternative constructions or equivalents can be implemented without departing from the scope and spirit of the present invention as set forth and defined by the appended claims.

What is claimed is:

1. A special effect device for providing a desired special effect to a video signal on the basis of a key signal, the device comprising:
a key signal control unit for controlling the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to the video signal; and
a video signal processing unit for changing the video signal on the basis of the key signal,
wherein if a maximum level as the reference value is KeyMax and the arbitrary position within the frame area is a position (X, Y) defined in an orthogonal coordinate system in which the nearest position to the arbitrary position, of positions on the inner edge that provide the maximum level, is used as the origin, the key signal control unit gives the level of the key signal based on the following equation (1):

$$BorderKey = KeyMax - \frac{\sqrt{X^2 + Y^2}}{\sqrt{2}} \begin{pmatrix} 0 \leq X \leq 512 \\ 0 \leq Y \leq 512 \end{pmatrix} \quad (1)$$

$$KeyMax = 512.$$

2. A special effect device for providing a desired special effect to a video signal on the basis of a key signal, the device comprising:
a key signal control unit for controlling the level of a key signal corresponding to an arbitrary position within a frame area to a level corresponding to a minimum distance from an inner edge of the frame area on the basis of the level of a key signal on the inner edge of the frame area as a reference value so that the frame area appears along an outer circumference of an image corresponding to the video signal; and
a video signal processing unit for changing the video signal on the basis of the key signal,
wherein if a maximum level as the reference value is KeyMax, an arbitrary function is fx, and the arbitrary position within the frame area is a position (X, Y) defined in an orthogonal coordinate system in which the nearest position to the arbitrary position, of positions on the inner edge that provide the maximum level, is used as the origin, the key signal control unit gives the level of the key signal based on the following equation (2):

$$BorderKey = fx\left(KeyMax - \frac{\sqrt{X^2 + Y^2}}{\sqrt{2}}\right)\begin{pmatrix} 0 \leq X \leq 512 \\ 0 \leq Y \leq 512 \end{pmatrix} \quad (2)$$

$$KeyMax = 512.$$

* * * * *